United States Patent [19]

Beaven et al.

[11] Patent Number: 4,910,505

[45] Date of Patent: Mar. 20, 1990

[54] GRAPHIC DISPLAY APPARATUS WITH COMBINED BIT BUFFER AND CHARACTER GRAPHICS STORE

[75] Inventors: Paul A. Beaven, Romsey; Adrian J. Hawes, Chandlers Ford; Roger J. Llewelyn, Winchester, all of United Kingdom

[73] Assignee: International Business Machines Corporation, Armonk, N.Y.

[21] Appl. No.: 217,094

[22] Filed: Jul. 7, 1988

Related U.S. Application Data

[63] Continuation of Ser. No. 898,173, Aug. 20, 1986, abandoned.

[30] Foreign Application Priority Data

Sep. 10, 1985 [EP] European Pat. Off. ...... 085306404.6

[51] Int. Cl.[4] .............................................. G06F 13/00

[52] U.S. Cl. .................................... 340/750; 340/747; 340/799

[58] Field of Search ............... 340/750, 798, 799, 747, 340/748

[56] References Cited

U.S. PATENT DOCUMENTS 3,821,730 6/1974 Carey et al. ........................ 340/799
4,094,000 6/1978 Bradevold .......................... 340/711
4,245,308 1/1981 Hirschman et al. ................ 364/200
4,278,973 7/1981 Hughes et al. ...................... 340/721
4,298,931 11/1981 Tachiuchi et al. ................. 340/799
4,308,532 12/1981 Murphy ................................ 340/728
4,667,190 5/1987 Fant .................................... 340/747
4,686,521 8/1987 Beaven ................................ 340/747

*Primary Examiner*—Alvin Oberley
*Attorney, Agent, or Firm*—Marc D. Schechter

[57] ABSTRACT

A graphics display apparatus with a combined bit buffer and character graphics store includes a coded display buffer containing pointers to the store. The store is constituted by odd and even memories used to derive bit patterns for odd and even character cell columns on the display and is partitioned into a font area and a bit buffer area. In a first mode of operation, compatible with existing programmed symbol arrangements, pointers in the coded display buffer in conjunction with odd/even select signals and slice signals derive the bit patterns for each raster scan line of the display. In a second mode of operation, a graphic image to be displayed is stored as a bit map in the bit buffer area: the required bit pattern is derived using slice and odd/even select signals in conjunction with pointers stored in the coded display buffer.

3 Claims, 4 Drawing Sheets

GRAPHIC DISPLAY APPARATUS WITH COMBINED BIT BUFFER AND CHARACTER GRAPHICS STORE

This is a continuation of application Ser. No. 898,173, filed Aug. 20, 1986, now abandoned.

This invention relates to a graphic display apparatus having a combined bit buffer and character graphics store.

BACKGROUND TO INVENTION

Conventional alphanumeric cathode ray tube display terminals, such as the IBM 3277, 3278 and 3279 display stations, use a display refresh buffer storing coded representations of the characters or symbols to be displayed on a raster-scanned cathode ray tube display. The display is refreshed by periodically reading the codes from the display refresh buffer and using these codes to access a character generator which includes a store which contains the actual bit patterns needed to display the characters or symbols. The character generator store need only store the bit patterns for a particular character or symbol once, no matter how many times that character is to be displayed. If the character generator store is a writable one such as is the case of the IBM 3279 and 8775 display stations, (see for example U. S. Pat. No. 4,245,308 and 4,278,973) graphics pictures can be displayed using the so-called character graphics technique. In this technique, the graphics picture is built up from a number of special characters or symbols. Codes representing these characters are stored in the display buffer and the corresponding bit patterns are stored in the writable memory of the character generator. Once the appropriate codes and bit patterns have been loaded into the display buffer and character generator once, operation is like the conventional alphanumeric display. It will be seen, therefore, that the codes stored in the display buffer are pointers to the required bit patterns.

Another type of graphics display apparatus (see, for example, co-pending commonly-assigned US Patent Application Ser. No. 748,259) uses the so-called bit buffer approach. In this arrangement, each picture element (pel or pixel) on the display screen is associated with a minimum storage requiremet of at least one bit for monochrome or at least 3 bits for color. Thus a display capable of displaying 1000×1000 pels would need at least a 1M bit buffer if monochrome or at least a 3M bit buffer if color. Typical of such bit-for-pel buffered graphics displays are the IBM 5080, 3270PC-GX and 3270 PC-AT/GX displays.

Some modern displays, such as the IBM 3270 PC-G and 3270 PC-AT/G displays, use a bit-for-pel buffer for displaying graphics and a coded display buffer and character generator for displaying alphanumeric characters: in this case the character generator store used need not to be a writable store since it will only be used to display "standard" characters or symbols. Co-pending commonly-assigned US patent application Ser. No. 708,755, now U.S. Pat. No. 4,686,521 describes how the graphics and alphanumeric data can be mixed.

The programmed symbol or character graphic technique of displaying graphic images, despite being very efficient in its use of random access memory (RAM), suffers from three disadvantages. Firstly, the RAM must be able to cycle at character display rates, typically 270 nsec for a high quality color display. Secondly, a graphics processing routine can take as much as 60% of its time pre-allocating the programmed symbol cells in the display buffer. Thirdly, the complexity of detail that may be displayed is limited by the number of programmed symbols available: the display processor can run out of spaces in the character generator memory. U.S. Pat. No. 4,308,532 summarises the advantages and disadvantages of various graphic display techniques and proposes a solution to the problems associated with a character graphics system when the character generator memory is full. U.S. Patent 4,308,532 proposes that when the character generator memory is full, the graphics cells be displayed at lower resolution to create free space in the character generator. In order to avoid certain bandwidth restrictions, it also proposes splitting the character generator into two sections, one called the even-cell generator and the other the odd-cell generator. The odd-cell generator contains bit patterns corresponding the odd-numbered *columns of pels* and the even-cell generator contains bit patterns corresponding to even-numbered *columns of pels.* Normally the output of the odd-cell and even-cell generators would be interleaved but to display at low resolution only the odd or even-cell output is used.

SUMMARY OF THE INVENTION

An object of the present invention is to provide a display apparatus having a combined bit buffer and character graphics store which requires slower (and therefore cheaper) memory than a full bit for pel graphics memory but which is flexible in use. A further object is to ensure that the display apparatus remains compatible with an existing programmed symbol arrangement.

According to the invention, a graphics display apparatus for displaying graphic images on a raster scanned cathode ray tube comprises a coded display buffer for storing coded representations of characters or other symbols to be displayed and serving as pointers to bit patterns stored in a writable memory of a character generator, display control means operable to load bit patterns into the writable memory and pointers into said coded display buffer, and addressing means operable during refresh of the raster scanned display to obtain pointers from said coded display buffer to address said writable memory to obtain corresponding bit patterns, characterised in that said writable memory is constituted by two stores, one containing bit patterns used to display characters or other symbols in odd-numbered columns of the display and the other containing bit patterns used to display characters or other symbols in even-numbered columns of the display, said addressing means causing said pointers to address each of said stores, and in that means is provided for selecting which store is to supply a bit pattern to the display.

In contrast with the aforementioned U.S. Pat. No. 4,308,532, the odd/even distribution of data is on a *cell column* basis, not a *pel column* basis.

BRIEF DESCRIPTION OF THE DRAWINGS

The invention will now be described by way of example with reference to the accompanying drawings, in which.

DESCRIPTION OF PREFERRED EMBODIMENT

Figure 1:
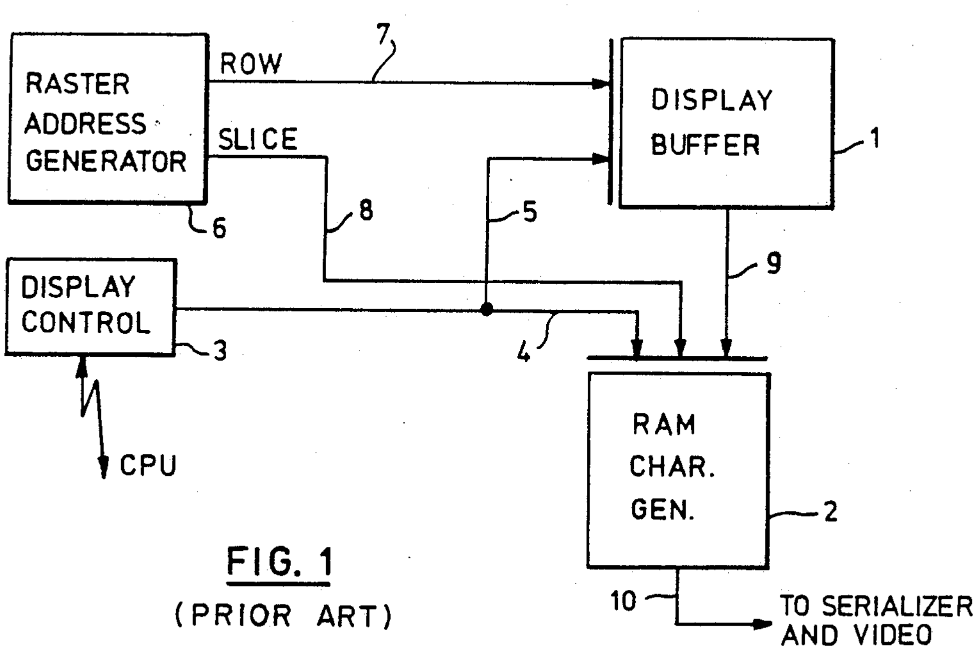
FIG. 1 (PRIOR ART)
FIG. 1 is a block diagram showing parts of a known display apparatus.

Referring now to FIG. 1, a known display apparatus such as the IBM 3279 or 8775 display includes a display buffer 1 arranged to contain coded representations of characters or other symbols to be displayed on a raster scanned cathode ray tube display screen, not shown. The coded representations in the display buffer 1 serve as pointers to bit patterns stored within a character generator 2. A display control 3 loads bit patterns along line 4 into the random access memory of the character generator 2 and pointers along line 5 into the display buffer 1. To display the contents of the display buffer 1 on the CRT, it is necessary to refresh the latter by periodically addressing the display buffer 1 and hence the character generator 2. This periodic addressing is performed by means of a raster address generator 6 which accesses a row of coded characters from the display buffer 1 along line 7. A slice signal on line 8 together with the output of the display buffer 1 on line 9 addresses the character generator 2 to derive the bit pattern on line 10 which is subsequently serialised in a serialiser, not shown, before transmission to the video circuits of the CRT. (Each row of characters or symbols is made up from a number of slices, each slice corresponding to a raster scan line of the CRT). Not shown is the link between the display control 3 and a host processor.

As indicated above, such a technique of displaying characters and symbols is well known as is the programmed symbol (PS) technique of displaying graphical images using so-called character graphics. In the PS technique, the host processor loaded, for example, with the IBM Graphical Data Display Manager (GDDM) computer program, determines what special characters are needed to display a particular graphical image and transmits bit patterns corresponding to those special characters to the display terminal (for example the aforementioned 3279 or 8775 displays) where they are loaded into the character generator as described above. Typically, the random access memory 2 will be 2K bits in size allowing some 128 different PS characters to be stored therein.

As stated above, the PS method of displaying graphic images is very efficient in its use of random access memory but suffers from three disadvantages. An object of the invention is to provide an arrangement which mitigates these three disadvantages whilst retaining compatibility with existing programmed symbol techniques such as the IBM GDDM program mentioned above.

Figure 2:
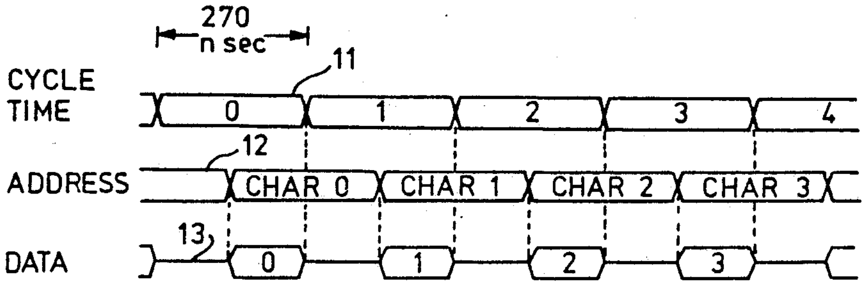
FIG. 2 (PRIOR ART)
FIG. 2 is a timing diagram associated with FIG. 1.

FIG. 2 is a timing diagram serving to illustrate the timing requirement. Waveform 11 represents the memory cycle time and typically is 270 nsec. Waveform 12 represents the time taken to address the character generator and waveform 13 represents the time available to obtain character data from the character generator. In order to supply character slices every 270 nsec in a tolerated design, a 200 nsec RAM would ideally be used. However although such memories are available, they are relatively expensive and tend to be of low density.

Figure 3:
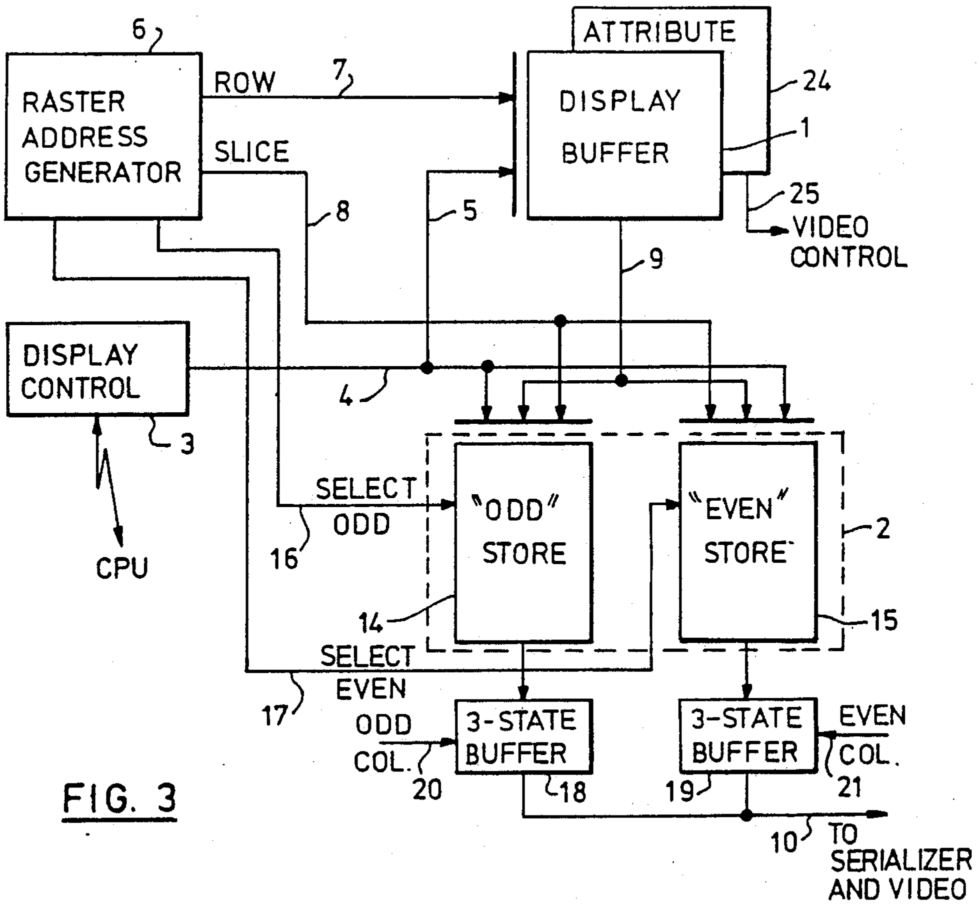
FIG. 3 is a block diagram showing parts of a preferred embodiment of the invention operable to display programmed symbols.

The invention uses a somewhat larger but slower random access memory which is operable in one mode as an interleaved memory compatible with the known PS technique and operable in a second mode as a bit buffer. FIG. 3 shows an embodiment of the invention; similar parts to those shown in FIG. 1 are shown with similar reference numerals and will not be further described. The most significant difference is that the character generator RAM 2 is larger and consists of an "odd" store 14 and an "even" store 15. In the first mode of operation, PS bit patterns are loaded into the character generator 2 along line 4 in the same manner as in FIG. 1 except that each of the stores 14 and 15 will contain the same data. During refresh of the CRT display screen, the "odd" store 14 will supply bit patterns for the odd columns of the dislay and the "even" store 15 will supply bit patterns for the even columns. To store 128 PS characters, each of the stores 14 and 15 will need to be 2K bits in size (total of 4K bits). However since each of the stores 14 and 15 is cycled at half the character rate, ie 540 nsec, the cost of this memory can be significantly less than half that of a 270 nsec memory. Odd-select and even-select signals on lines 16 and 17 select the appropriate odd or even store whose output is gated through 3-state buffers 18 and 19 respectively under control of odd and even gating signals on lines 20 and 21 respectively.

Figure 4:
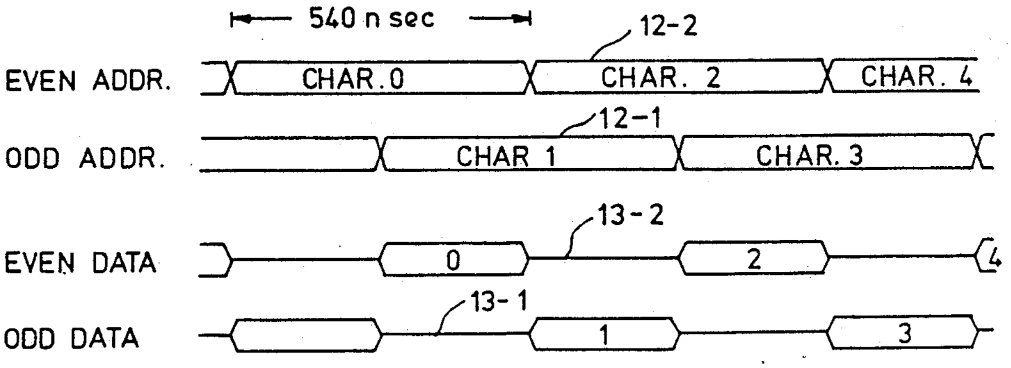
FIG. 4 is a timing diagram associated with FIG. 3.

FIG. 4 shows odd and waveforms 12-1, 12-2 and 13-1, 13-2 corresponding to the waveforms 12 and 13 of FIG. 2 and illustrates how slow memories can be used to meet the 270 nsec timing requirement.

Apart from solving the timing problem, this method of implementing the PS technique also allows the solution of the other two problems mentioned above. Because of larger memory is used, it can also be used as a bit buffer and this second mode of operation is shown in FIG. 5.

Figure 5:
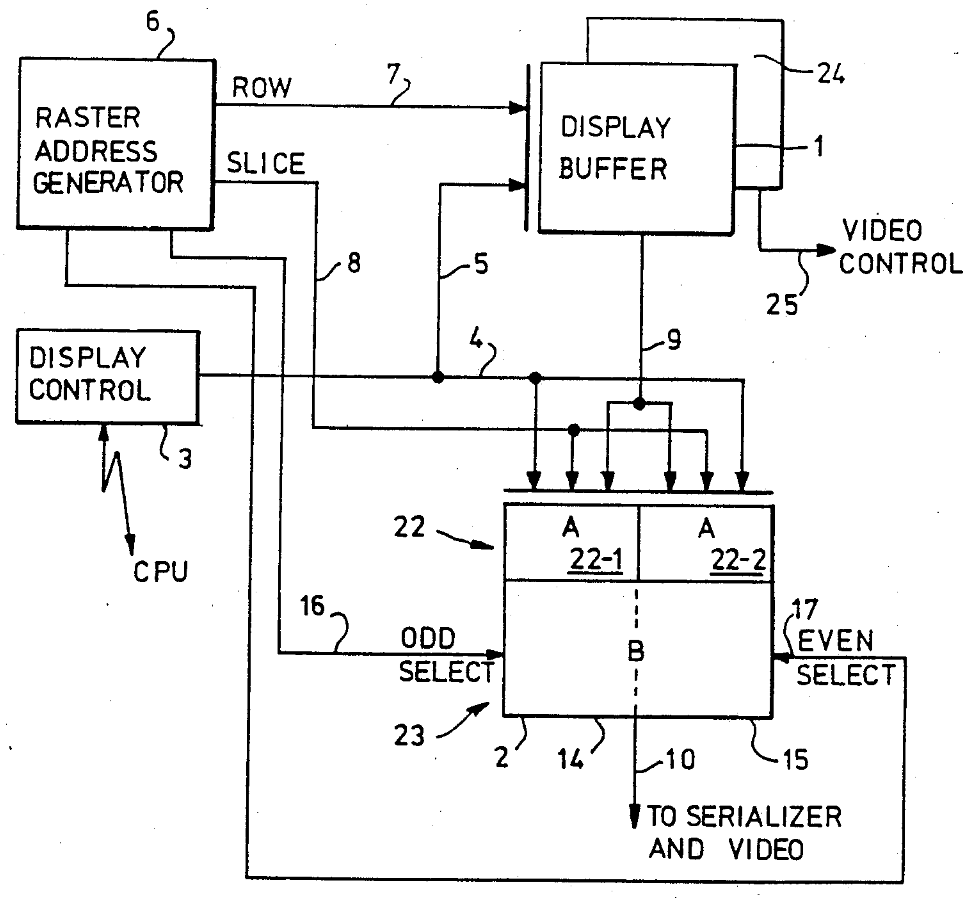
FIG. 5 is a block diagram showing how the embodiment of FIG. 3 may be re-configured to operate in a second mode in a manner similar to a bit-buffer, and FIG. 6 serves to illustrate how a graphic image may be displayed either as a programmed symbol or as an image in a bit buffer.

As shown in FIG. 5, the memory 2 (constituted by the odd and even stores 14 and 15) is partitioned under program control into a PS font store section 22 and a bit buffer section 23. The font section 22 is constituted by odd and even parts 22-1 and 22-2. Programmed symbols and other characters are displayed by loading pointers A1, A2, A3 etc into the display buffer 1 in positions corresponding to positions at which these characters are to be displayed on the screen. The pointers A1 etc point to Section 22-1, 22-2 of the memory 2. On the other hand, if the graphic image is to be displayed using the bit buffer section 23, pointers B1, B2, B3 etc are loaded into the display buffer 1. An important feature of the preferred embodiment is that identical code points (pointers) are loaded into adjacent odd/even cells of the display buffer 1 but ambiguities in the meaning of the code points (the pointer is pointed to both an odd and an even column) are resolved using the even/odd select signal.

By adjusting the sequence of A and B pointers in the display buffer 1, the screen may be divided into bit buffer partitions and PS/character partitions. In this mixed mode the number of partitions on the screen is limited only by the characteristic that they must fall on character boundaries.

As an example, suppose that the display buffer 1 is written with the sequence B1, B2, B3, A2, A3, A2, A1, B8, B9, B10 etc. In other words a character string A2, A3, A2, A1 (a small partition) is embedded in the bit buffer area in place of the bit buffer cells B4, B5, B6, B7. (It will be appreciated that a particular bit buffer address will always be stored in the same cell of the display buffer 1 but the bit pattern in store section 23 to which it points will vary). This technique leads to very efficient creation and movement of character partitions. For example, to shift the exemplary character partition by two positions, the display buffer sequence indicated above needs to be modified to B1, B2, B3, B4, B5 A2, A3, A2, A1, B10 etc. This requires just 10 store accesses in the relatively *fast* display buffer 1. In a pure bit buffer approach, (assuming 9×16 pel characters of 3 bits/pel for color) some 10×16×3=480 accesses would be needed in a slow bit buffer store. A bit buffer in random access mode is typically half as fast as a display buffer making the embodiment described about 96 times faster than a conventional bit buffer for this sort of data manipulation.

Also in this second mode of operation, the screen can be cleared much more quickly than with the conventional bit buffer approach. To clear the screen, the display controller 3 writes blank pointers to every character position in the fast display buffer 1 taking approximately 3000 write cycles. (The programmed symbols may then be individually created as and when they are needed again). By comparison, to clear the equivalent conventional bit buffer would require some 48,000 write cycles to a slow store.

It should be noted that as in conventional coded display buffer arrangements, the display buffer 1 can have associated therewith a character attribute store 24. The character attribute store 24 contains at least one attribute byte for each character, the attribute bytes being read simultaneously with the display buffer 1 and determining how their associated characters are displayed, eg color, blinking etc by means of a video control signal on line 25. A pure bit buffer would require an extra plane of storage to control blinking.

Figure 6:
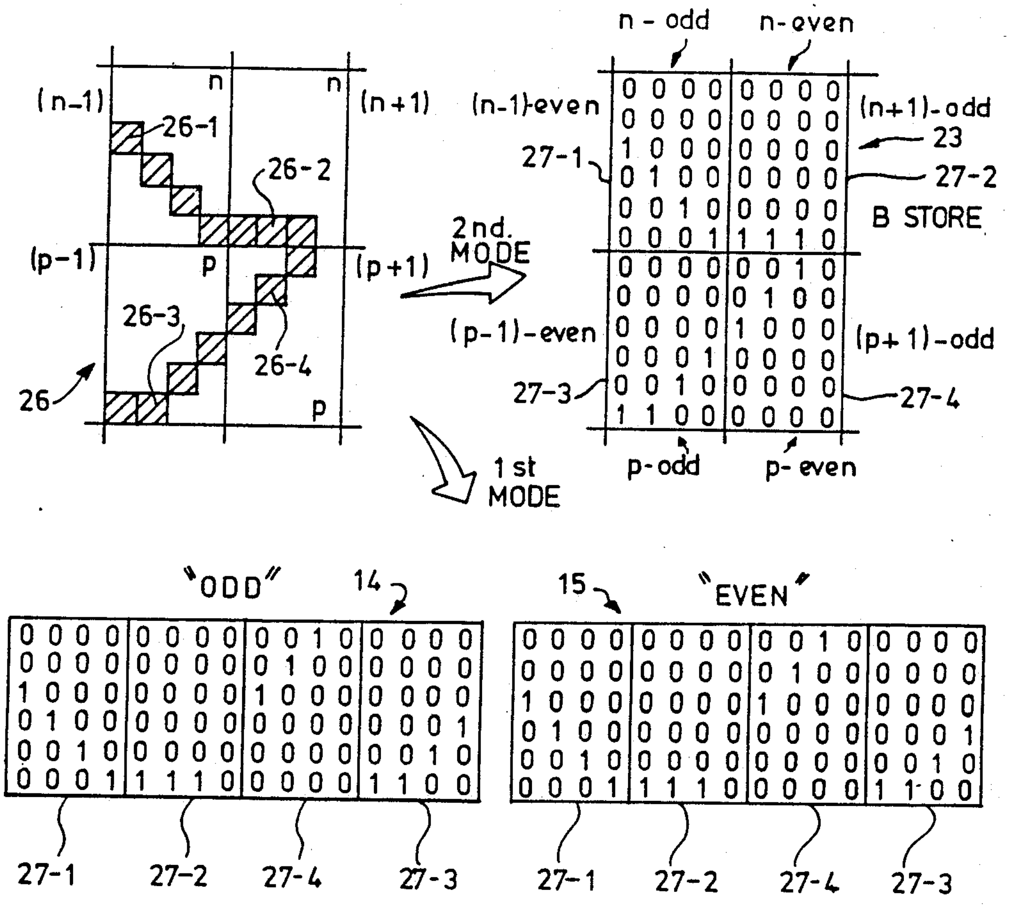

FIG. 6 serves to illustrate how a graphics image 26 consisting of four graphic characters or cells 26-1, 26-2, 26-3 and 26-4 can be displayed either as programmed symbols in the first mode or as a "bit buffered" image as in the second mode of operation. Each character cell position on the screen has an address and will either be in an odd or even column. Thus graphics characters 26-1 and 26-2 are to be displayed, respectively at addresses N (odd) and N (even) whilst graphic characters 26-3 and 26-4 are to be displayed respectively at addresses P (odd) and P (even).

In the first mode of operation, the bit pattern 27-1 corresponding to the character cell 26-1 is stored in both the odd and even stores (14 and 15, FIG. 3) at the same address. Similarly bit patterns 27-2, 27-3, 27-4 for each of the character cells 26-2, 26-3 and 26-4 are stored within the odd and even stores. It will be appreciated that the positions of the bit patterns 27-1 to 27-4 within the character generator bears no relationship with one another. The appropriate bit pattern is derived by means of the pointer within the display buffer 1.

In the second mode of operation, the character generator store is partitioned with a bit buffer area 23 divided into cells corresponding to the character cells on the display. In this mode, the bit patterns 27-1 to 27-4 are stored in cells of address N and P (odd and even) as shown. The store 23 will thus contain a bit map just like a conventional bit buffer: however the bit pattern is addressed on a cell basis using pointers B1, B2, B3 etc in the display buffer 1, a slice count on line 8 and an odd-/even select signal. Code points stored in the display buffer 1 are the same for adjacent cells but ambiguities are resolved because of the odd/even column selection. Thus although the pointers in the buffer 1 for cell "n" are the same, they derive different patterns from the store 23 (although the cells have the same address). In a modification, the font area 22, FIG. 5, can be reduced in size for a particular size of font by not using the even-/odd select signal whilst addressing the font store. However, this would introduce complexity into the addressability of the memory 2 and incompatibility with the existing PS scheme.

A typical conventional bit buffer can display 720 pels × 512pels. This is equivalent to 80 characters by 32 characters, ie 2560 cells. Allowing a further 256 cells for the font store 22 (giving up to 128 different characters in the preferred embodiment), this gives a total size of 2816 cells, that is 405,504 bits. In contrast, the conventional bit buffer approach would require a fast memory of at least size 3×720×512×1,105,920 bits.

What has been described is a flexible arrangement operable in a first mode in a manner compatible with existing programmed symbol arrangements and operable in a second mode to provide bit buffer characteristics with a slower, smaller memory than a conventional bit buffer approach. The second mode has certain performance advantages over the conventional bit buffer approach. A disadvantage is that "transparent" alphanumeric characters cannot be overlaid on a graphics image (although a composite graphics/alphanumeric cell can be created and stored in the memory and hence displayed). A disadvantage over arrangements with only a bit buffer (such as the IBM 3270 PC-GX and 3270 PC-GX/AT) is the need for a coded display buffer/character generator as well as the "bit buffer" although many existing conventional bit buffer displays also have a coded display buffer and character generator (for example the IBM 3270 PC-G and 3270 PC-G/AT. The display control (3) and other control logic can be formed from either hard-wired logic, a programmable microprocessor or a programmed logic array. It is believed that no detailed description is necessary since it will be apparent to any competent logic designer how such controls should be adapted to operate the display as described above.

We claim:

1. Graphics display apparatus for displaying graphic images on a raster scanned cathode ray tube comprising a coded display buffer for storing coded representations of characters or other symbols to be displayed and serving as pointers to bit patterns stored in a writable memory of character generator, display control means operable to load bit patterns into the writable memory and pointers into said coded display buffer, and addressing means operable during refresh of the raster scanned display to obtain pointers from said coded display buffer to address said writable memory to obtain corresponding bit patterns, in which said writable memory is constituted by two stores, one for containing bit patterns used to display characters or other symbols in odd-numbered columns of the display and the other for containing bit patterns used to display characters or other symbols in even-numbered columns of the display, said addressing means causing said pointers to address each of said stores, and in which means is provided for selecting which store is to supply a bit pattern to the display, said graphics display apparatus being operable in a first mode to load identical bit patterns into corresponding locations of the two stores and operable in a second mode to load a bit map into storage and pointers to character-sized sections of said bit map into a section of the memory locations in said coded display buffer corresponding to positions on the display at which the bit map is to be displayed.

2. Graphics display apparatus as claimed in claim 1, in which during operation in said second mode said memory is partitioned into a font section and a bit buffer section, said bit buffer section containing said bit map and said font section being constituted by two parts each containing identical bit patterns in corresponding locations.

3. Graphics display apparatus as claimed in claim 2, further comprising a character attribute buffer for containing character attributes for controlling the manner in which a character or other symbol is to be displayed.

* * * * *